May 6, 1969    D. M. HARVEY    3,442,191
OPTICAL MEANS FOR CONTROLLING ACCEPTANCE ANGLE
OF A PHOTORESPONSIVE DEVICE
Filed May 27, 1966

DONALD M. HARVEY
INVENTOR.

BY Thomas R. Lampe
Robert W. Hampton
ATTORNEYS

United States Patent Office 3,442,191
Patented May 6, 1969

3,442,191
OPTICAL MEANS FOR CONTROLLING ACCEPTANCE ANGLE OF A PHOTORESPONSIVE DEVICE
Donald M. Harvey, Rochester, N.Y., assignor to Eastman Kodak Company, Rochester, N.Y., a corporation of New Jersey
Filed May 27, 1966, Ser. No. 553,432
Int. Cl. G01j 1/06; G02f 1/34
U.S. Cl. 95—10   5 Claims

ABSTRACT OF THE DISCLOSURE

In a camera having a lens with an optical axis and an automatic exposure control device, the effect of high back lighting on the device is controlled by using optical means including a transparent chamber having a gas bubble which floats in a liquid. When the camera is rotated about the optical axis of the lens, the position of the bubble changes with respect to the exposure control device to thereby control the field of view through which light is provided to the device.

---

This invention relates to an optical system for use with cameras incorporating automatic exposure control mechanisms to confine the acceptance angle of the field of view of the associated photoresponsive means to an angle generally below the horizontal.

Various means have been employed in the past for restricting the acceptance angle of a photoresponsive means in photographic or cinematographic cameras to an angle generally below the horizontal. The most commonly used expedient has been the use of fixed mechanical baffles which cause the associated cell to "see" down when the base of the camera is held in a horizontal position. The use of such fixed baffles is somewhat restrictive in that customers frequently use a camera (even cameras having a square format) with the base thereof held in a vertical position. When the camera is held in this latter position the cell no longer "sees" down, but looks right or left, thus permitting the portion of the sky (high) rays to impinge on the photoresponsive device. The automatic exposure control mechanism is thus adjusted for bright light conditions with the resulting darkening of the subject being photographed.

It is therefore an object of this invention to provide an improved optical system for confining the acceptance angle of a photoresponsive element to an angle generally below the horizontal when the optical axis of the associated camera lens is generally maintained along the horizontal.

This objective has been attained in the present invention by providing an optical system with a movable means defining refractive and reflective surfaces to confine the acceptance angle of an associated photoresponsive device to an angle generally below the horizontal regardless of the angular orientation of said camera so long as the optical axis of the camera lens is generally maintained along the horizontal.

Other objects of the invention will appear from the following description, reference being made to the accompanying drawings wherein.

Figure 1:
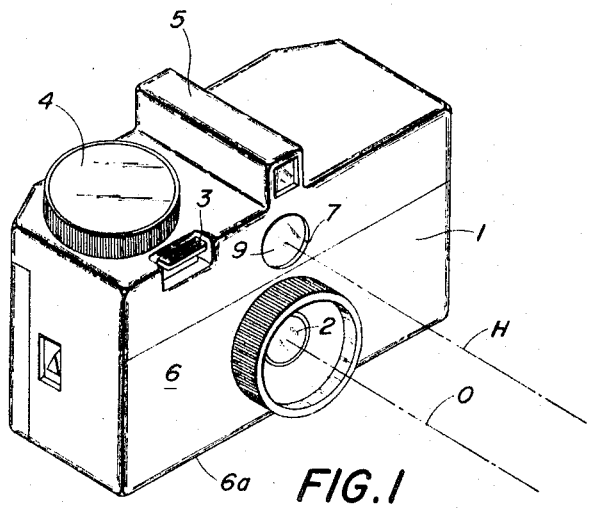
FIG. 1 is an isometric view of a photographic camera incorporating the elements of the invention disclosed herein.

Reefrring now to FIG. 1, a conventional camera 1 is shown having a simple objective lens 2 and a shutter release level 3 which actuates the camera shutter mechanism (not shown) through any known linkage means. A winding knob 4 is used by the operator to advance the film (not shown) in the conventional manner. A telescopic-type viewfinder 5 is mounted on top of the camera and is used by the operator to compose the scene for purposes of taking a photograph in the usual manner. The front face plate 6 of camera 1 has an aperture 7 therein as shown; the lower portion of face plate 6 defining a camera base 6a.

Figure 2:
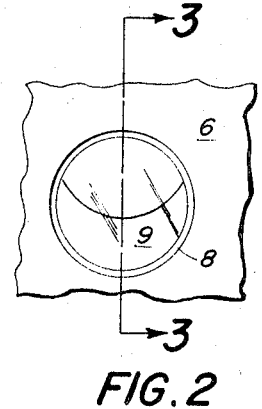
FIG. 2 is an enlarged end view of the optical system accordance to this invention.
Figure 3:
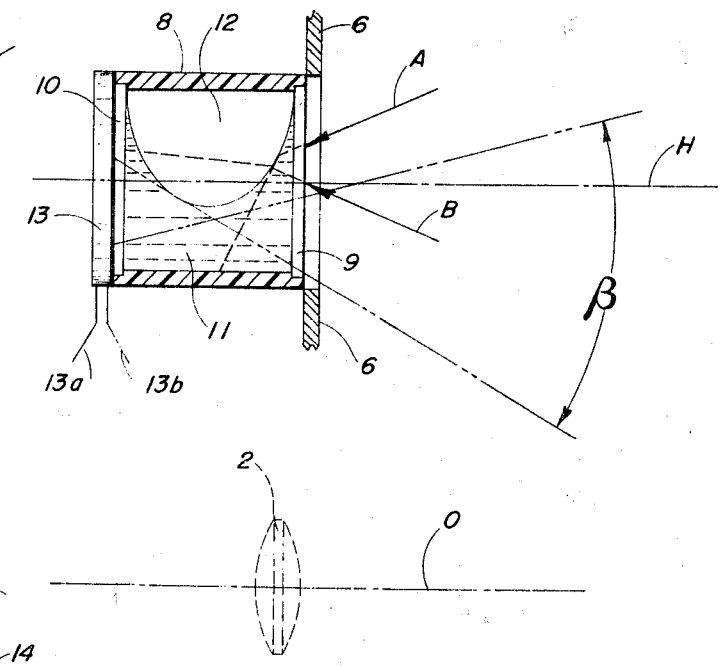
FIG. 3 is an enlarged partial, sectional view taken along line 3—3 of FIG. 2 showing in schematic fashion the operational relationship of the optical system according to this invention in conjunction with an associated photoresponsive element and lens.

The optical system according to the present invention is disposed immediately behind aperture 7 and projects inwardly of the camera casing in the manner which may most clearly be seen with reference to FIGS. 2 and 3. The optical system includes a hollow, clear plastic tube 8 of circular construction, the external cylindrical dimensions of the tube corresponding to the circular dimensions of aperture 7 in the camera face plate. The internal cylindrical wall of tube 8 is of light absorbing material, such as black, non-reflective paint, for the purpose which will more fully be brought out below. Circular end pieces 9, 10 are constructed of clear plastic material and form a fluid tight seal with tube 8. The end pieces may be affixed to the end of the tube in any known manner. The optical system is mounted in the camera so that cylindrical axis H of tube 8 is substantially parallel to the optical axis O of lens 2 (see FIG. 3).

Figure 4:
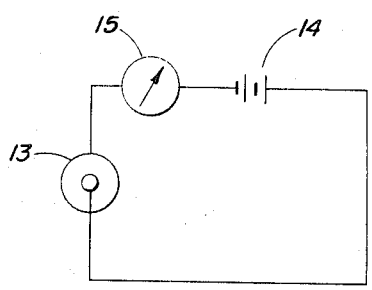
FIG. 4 is an electrical wiring diagram adapted for use with, and incorporating elements of, the mechanism shown in FIG. 3.

As may most clearly be seen with reference to FIG. 3, tube 8 is partially filled with a clear refractive liquid 11, the remainder of the tube space being occupied by a bubble 12 of air or other fluid lighter than liquid 11. Disposed immediately adjacent inwardly extending circular end piece 10 is a photoresponsive element 13 of a circular construction corresponding in size to the external dimensions of tube 8. Photoresponsive element 13 is connected by means of wire leads 13a, 13b to an associated camera photometric system of any usual well-know type. FIG. 4 illustrates a conventional photometric circuit wherein photoresponsive element 13 is connected in series with a battery 14 and an electric measuring instrument 15 which serves to position an associated exposure regulating device (not shown) of any known type.

The operation of the device will now be described with a particular reference to FIG. 3. Due to the refraction and reflection characteristics created by the bubble 12 and liquid 11 contained in tube 8 the vertical angle viewed by the photoresponsive element 13 is defined by the angle $\beta$ regardless of the angular orientation of the camera so long as the optical axis of the camera lens is maintained generally along the horizontal. When a sky (high) light ray enters the circular end piece 9 of the optical system, as for example illustrated by the arrow indicated by reference numeral A, bubble 12 reflects the major portion thereof into the dark sidewalls to tube 8. The ground (low) rays, on the other hand, are refracted into the cell in the manner shown with respect to the light ray indicated by arrow reference numeral B. In practice, however, some refraction and reflection of both the high and low light rays takes place, depending on bubble size and various other factors, including the type of liquid contained in the tube coacting therewith. Ordinary water ($H_2O$) is suitable for this use and is the most readily available of materials that may be used. The bubble size, type of liquid, and other factors may be varied according to the angle $\beta$ that the operator wishes to define.

Gravitational forces acting on the fluid in tube 8 tend to maintain the fluid at a specific orientation with respect to the horizon when the camera is rotated. Accordingly, the field of view and the acceptance angle remain substantially the same during rotation of the camera about its optical axis.

Having described the general form of the present invention, it should be understood that the form illustrated herein has been selected to facilitate the disclosure of the invention rather than to limit the number of forms which it may assume, and various modifications, adaptations, and alterations may be applied to the form shown to meet the requirements of practice without departing from the spirit or scope of the present invention.

I claim:
1. A camera comprising:
 (a) a housing,
 (b) a lens mounted on said housing and having an optical axis,
 (c) an exposure control device supported by said housing including a photoresponsive element for controlling the operation thereof in response to scene light received by said photoresponsive element, and
 (d) means carried by said housing and being freely movable with respect to said housing in response to gravitational forces for determining the field of view through which scene light is received by said photoresponsive element, said housing being movable with respect to said means during rotation of said housing about the optical axis of the lens without substantially changing said field of view.
2. A camera according to claim 1 wherein said means comprises: a hollow container having portions constructed of a material through which scene light can be transmitted to said photoresponsive element, said means further comprising two separate fluids within said container defining refractive and reflective surfaces.
3. A camera according to claim 2 wherein said container further comprises: other portions with inner surfaces having light absorbing characteristics, and said fluids in said container comprising a liquid and a gas.
4. A camera comprising:
 (a) a housing,
 (b) an exposure control device supported by said housing and including a photoresponsive element for controlling the operation thereof in response to scene light received by said photoresponsive element, and
 (c) means carried by the housing for determining the field of view through which scene light is received by said photoresponsive element, said means comprising two separate fluids defining refractive and reflective surfaces.
5. In a camera including a housing, a lens supported by the housing and having an optical axis, and an exposure regulating device having an electrical circuit including a photoresponsive element for controlling said device, the improvement comprising: means for defining an acceptance angle of said photoresponsive element and for confining said angle to an angle generally below the horizontal regardless of the angular orientation of said camera so long as the optical axis of said lens is generally maintained along the horizontal, said means comprising: a hollow cylindrical tube, the inner cylindrical wall of said tube having light absorbing characteristics, circular end pieces affixed to said tube and forming therewith a fluid tight seal, said end pieces being constructed of transparent material, said tube being partially filled with a liquid and partially filled with a gas to provide a bubble of gas in the tube, said gas bubble and said liquid defining refractive and reflective surfaces adapted to alter the path of light entering one end of the tube, thereby establishing said acceptance angle.

References Cited
UNITED STATES PATENTS

| 3,023,684 | 3/1962 | Stimson | 95—10 |
| 3,105,428 | 10/1963 | La Rue | 95—10 |

FOREIGN PATENTS

| 379,791 | 8/1964 | Switzerland. |

NORTON ANSHER, Primary Examiner.

J. F. PETERS, JR., Assistant Examiner.

U.S. Cl. X.R.

250—218; 350—285; 356—225